(12) United States Patent
Zhou

(10) Patent No.: US 10,515,614 B2
(45) Date of Patent: Dec. 24, 2019

(54) MUSICAL NOTATION SYSTEM

(71) Applicant: Jianxun Zhou, Xuzhou (CN)

(72) Inventor: Jianxun Zhou, Xuzhou (CN)

( * ) Notice: Subject to any disclaimer, the term of this patent is extended or adjusted under 35 U.S.C. 154(b) by 0 days.

(21) Appl. No.: 16/101,971

(22) Filed: Aug. 13, 2018

(65) Prior Publication Data

US 2019/0237049 A1 Aug. 1, 2019

(30) Foreign Application Priority Data

Jan. 29, 2018 (CN) .......................... 2018 1 0084093
Jun. 15, 2018 (CA) ...................................... 3008490

(51) Int. Cl.
*G09B 15/02* (2006.01)
*G10G 1/02* (2006.01)
*G10H 1/34* (2006.01)

(52) U.S. Cl.
CPC .............. *G10G 1/02* (2013.01); *G09B 15/026* (2013.01); *G10H 1/34* (2013.01); *G10H 2220/221* (2013.01)

(58) Field of Classification Search
CPC .......... G10G 1/02; G09B 15/026; G10H 1/34; G10H 2220/221
USPC ....................................................... 84/483.2
See application file for complete search history.

(56) References Cited

U.S. PATENT DOCUMENTS

| | | | | |
|---|---|---|---|---|
| 6,388,182 B1* | 5/2002 | Bermudez | ............ | G09B 15/026 84/470 R |
| 6,987,220 B2* | 1/2006 | Holcombe | ........... | G09B 15/026 84/483.2 |
| 7,453,036 B1* | 11/2008 | Henkel | ................ | G09B 15/003 84/470 R |
| 8,916,760 B1* | 12/2014 | West | ..................... | G09B 15/026 84/483.2 |
| 9,196,171 B2* | 11/2015 | Nguyen | ............... | G09B 15/026 |
| 9,881,514 B2* | 1/2018 | Ueoka | ...................... | G10G 7/00 |
| 9,947,238 B2* | 4/2018 | Tolan | .................... | G09B 15/023 |
| 2006/0011044 A1* | 1/2006 | Chew | ....................... | G10H 1/34 84/609 |
| 2007/0221043 A1* | 9/2007 | Hao | ...................... | G09B 15/004 84/477 R |
| 2008/0141849 A1* | 6/2008 | Johnston | ................ | G09B 15/02 84/483.2 |
| 2013/0319207 A1* | 12/2013 | King | .................... | G09B 15/023 84/471 R |
| 2014/0305284 A1* | 10/2014 | Cosgrove | ............. | G09B 15/001 84/478 |
| 2016/0210948 A1* | 7/2016 | Kelsey | ..................... | G10G 1/04 |

\* cited by examiner

*Primary Examiner* — Jeffrey Donels
(74) *Attorney, Agent, or Firm* — Getech Law LLC; Jun Ye

(57) ABSTRACT

A musical notation system is disclosed. The musical notation system comprises: a pitch symbol representing a key of a keyboard instrument, wherein the pitch symbol corresponds to a number representing a pitch in a numbered musical notation system and represents a white key and a black key of the keyboard instrument respectively in different forms; and a duration symbol representing a duration of the pitch symbol, the duration symbol corresponding to a symbol representing a duration in the numbered musical notation system.

15 Claims, 4 Drawing Sheets

MUSICAL NOTATION SYSTEM

TECHNICAL FIELD

The present application generally relates to a technical field for recording music, and in particular to a musical notation system.

BACKGROUND ART

Piano, as a basic teaching tool in the musical culture art, plays an irreplaceable role in teaching musical theory, vocal music and instrumental music. However, the piano, as first one of Top Three world instruments, makes ordinary people always look and sigh because of its price and learning difficulty. As economy develops rapidly, the piano is no longer a luxury commodity; especially, currently an inexpensive electronic piano can also meet needs of music lovers with features of a small footprint, adjustable volume and no need for tuning, thus are widely used in music theory, solfeggio and other special music teaching. Accordingly, broad masses are learning piano and other keyboard instruments more and more actively and passionately so as to enrich their own cultural life. It is no need to deny that a traditional piano teaching system is scientific and practical, and has trained a large number of pianists and performers. However, a beginner just getting involved in music is still deterred by a complex stave music theory the traditional piano teaching system relies on. Therefore, how to make a music beginner easier to get into a path of playing the piano becomes a valuable question.

SUMMARY OF THE INVENTION

In view of the above in the art, the present application is dedicated to provide a musical notation system capable of making a music beginner easy to locate a key of a keyboard instrument according to a music score, thereby easily starting a practice of playing the keyboard instrument, which greatly lowers a threshold of playing the keyboard instrument.

For this purpose, the present application proposes a musical notation system, comprising: a pitch symbol representing a key of a keyboard instrument, wherein the pitch symbol corresponds to a number representing a pitch in a numbered musical notation system and represents a white key and a black key of the keyboard instrument respectively in different forms; and a duration symbol representing a duration of the pitch symbol, the duration symbol corresponding to a symbol representing a duration in the numbered musical notation system.

The present application further proposes a musical notation system, comprising: a grid representing a minimum fixed duration of a note; and a pitch symbol representing a key of a keyboard instrument, wherein the pitch symbol corresponds to a number representing a pitch in a numbered musical notation system and represents a white key and a black key of the keyboard instrument respectively in different forms, wherein the pitch symbol within the grid represents a note with the pitch having the minimum fixed duration.

The present application further proposes a musical notation system, comprising: a grand staff without any sharp or flat on lines and spaces; and a note-head with a tag, corresponding to a note-head on a line or space with a sharp or flat in a legacy stave, wherein the tag differs sharp from flat.

With the musical notation system proposed in the present application, a music beginner can easily locate a key of a keyboard instrument according to a music score, thereby easily starting playing the keyboard instrument, which greatly lowers a threshold of playing the keyboard instrument.

BRIEF DESCRIPTION OF THE DRAWINGS

These and/or other aspects and advantages of the present application will become apparent and easy to understand from following detailed descriptions of embodiments of the present application in combination with the accompanying drawings, in which:

FIG. 3 is a schematic view of correspondence between a legacy numbered musical notation and a musical notation system according to an embodiment of the present application;

FIG. 4 is a schematic view of a structure of a musical notation system according to another embodiment of the present application;

DETAILED DESCRIPTIONS OF THE EMBODIMENTS

Hereinafter, exemplary embodiments of the present application will be described in detail with reference to the accompanying drawings. It is apparent that the described embodiments are only part but not all of the embodiments of the present application. It should be understood that the present application is not limited to the exemplary embodiments described here.

It is well known that a legacy numbered musical notation system is easy for a beginner just getting involved in music to understand and start learning music theory. However, notes in the numbered musical notation merely reflect relative pitch and are not easy to be mapped to keys on a piano keyboard, resulting in difficulty to find the keys on the piano keyboard with reference to a score in the numbered musical notation; thus, it is quite hard to play piano by using the numbered musical notation. In addition, white keys and black keys on the piano keyboard are not reflected at all in the numbered musical notation, causing further difficulty to play piano by using the numbered musical notation.

Musical notation systems proposed in the present application makes improvement on the legacy numbered musical notation system, where white keys and black keys on the piano keyboard are reflected respectively in the musical notation so that a pitch symbol in a music score is directly mapped to a key on the piano keyboard. Thus, with the musical notation systems of the present application, keys on the piano keyboard can be located rapidly so that it becomes quite simply and easy to play piano by following a score, which greatly lowers a threshold of playing the keyboard instrument.

Figure 1:
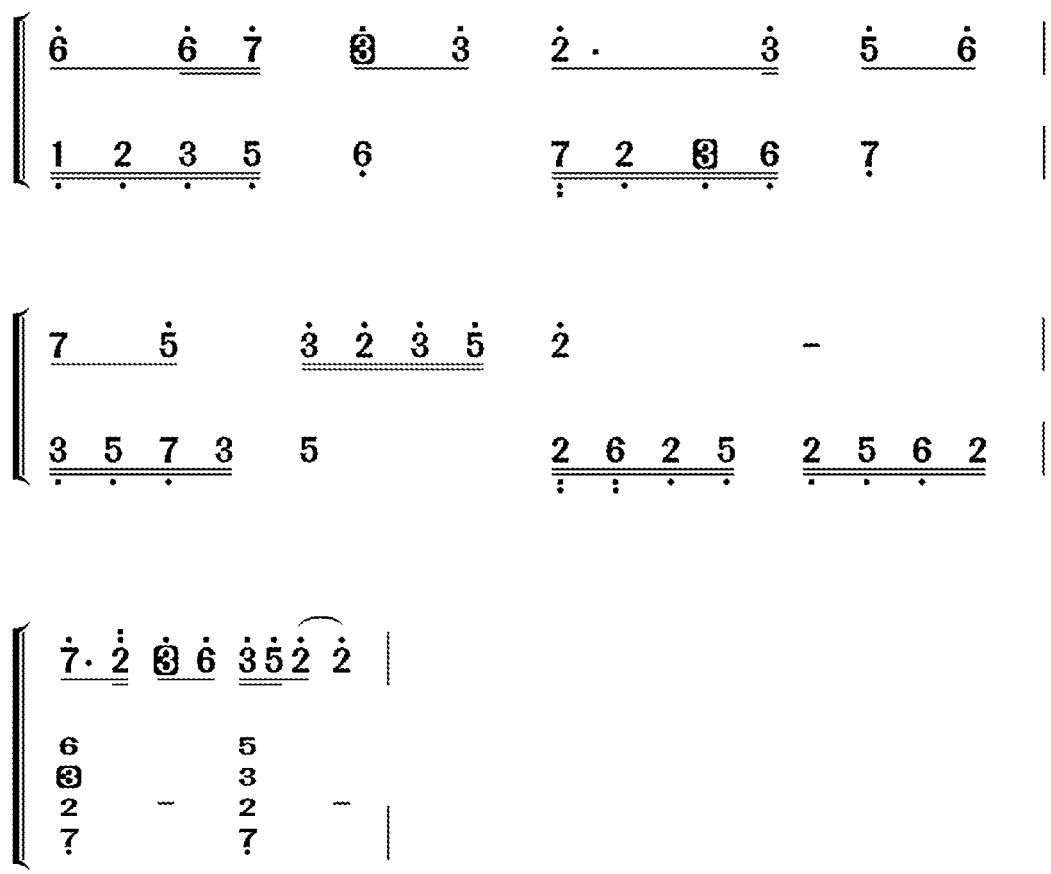
FIG. 1 is a schematic view of a structure of a musical notation system according to an embodiment of the present application.

FIG. 1 is a schematic view of a structure of a musical notation system according to an embodiment of the present application.

As shown in FIG. 1, the musical notation system according to an embodiment of the present application includes a pitch symbol and a duration symbol. Compared with the legacy numbered musical notation system, the musical notation system according to an embodiment of the present application makes improvement on the pitch symbol to represent directly a key on the piano keyboard with the pitch symbol corresponding to a number representing a pitch in the numbered musical notation system. As shown in FIG. 1, a number can be used to represent a pitch, just like 1, 2, 3, 4, 5, 6, 7 used in the numbered musical notation system. However, the pitch symbols representing a white key and a black key of the piano keyboard in FIG. 1 are shown respectively in different forms: in FIG. 1, the number mapped to the white key is shown in a normal form (black character on white background), while the number mapped to the black key is shown in a reverse display form (white character on black background), and optional display forms further include a number in a circle, for example, ②.

In the musical notation system according to an embodiment of the present application, the duration symbol, that is, the symbol representing a duration of a note, can adopt the representation form in the numbered musical notation system.

Figure 2:
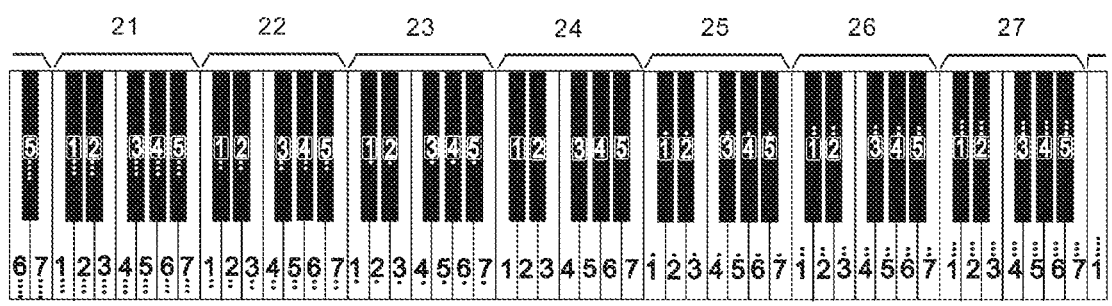
FIG. 2 is a schematic view of correspondence between a piano keyboard and pitch symbols in a musical notation system according to an embodiment of the present application.

FIG. 2 is a schematic view of correspondence between a piano keyboard and pitch symbols in a musical notation system according to an embodiment of the present application.

As shown in FIG. 2, the piano keyboard consists of 52 white keys and 36 black keys, including 7 groups of sub-keyboards in addition to leftmost 3 keys and one rightmost key, where each group of sub-keyboard consists of 7 white keys (expressed as C, D, E, F, G, A, B) and 5 black keys (expressed as $^\#$C, $^\#$D, $^\#$F, $^\#$G, $^\#$A), and corresponding keys in neighboring groups of sub-keyboards differ octave in pitch. The 7 groups of sub-keyboards are successively from low to high in pitch: contra octave 21, great octave 22, small octave 23, one-line octave 24, two-line octave 25, three-line octave 26 and four-line octave 27. The leftmost 3 keys and one rightmost key belong to sub-contra octave and five-line octave respectively. It is known in the art that the above arrangement of the piano keyboard is equivalently applicable to that of other keyboard instruments.

As shown in FIG. 2, in each group of sub-keyboard in the musical notation system according to an embodiment of the present application, the 7 white keys can be represented by 1, 2, 3, 4, 5, 6, 7 (solfège: do, re, mi, fa, sol, la, si) and the 5 black keys can be represented by 1, 2, 3, 4, 5. The different groups of sub-keyboards can be represented by adding a dot over or under the number where a dot over the number is added to represent an octave higher in pitch and a dot under the number is added to represent an octave lower in pitch, and the number without any dot represents an absolute high in pitch of a note in the one-line octave 24 of the piano keyboard.

In one embodiment, the pitch symbol in the musical notation system according to an embodiment of the present application can also adopt a letter like C, D, E, F, G, A, or B expressing a pitch name.

In another embodiment, the pitch symbol in the musical notation system according to an embodiment of the present application can adopt a tag other than the dot (for example, ^) to represent the octave change in pitch.

Figures 3, 4:
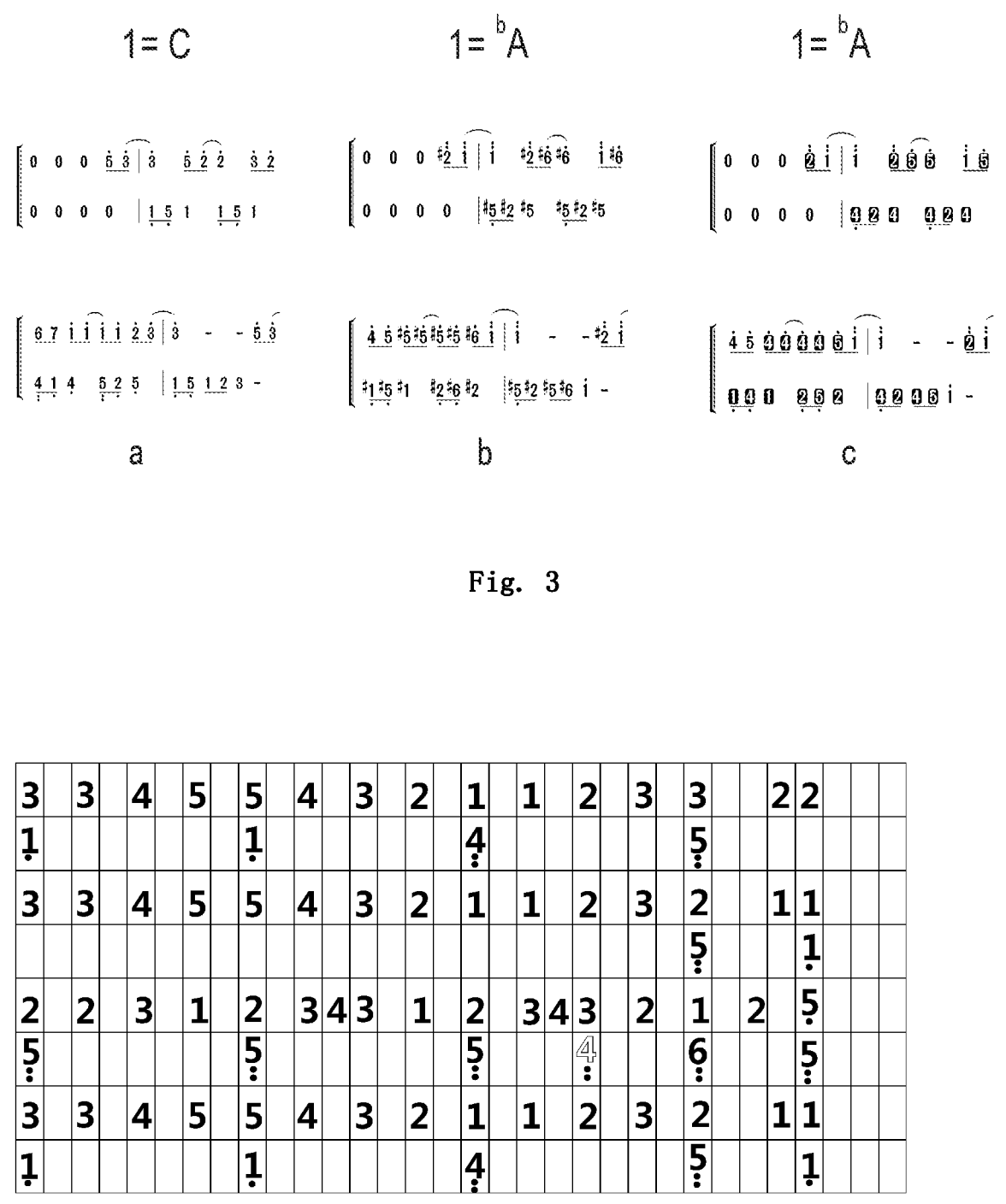

FIG. 3 is a schematic view of correspondence between a legacy numbered musical notation and a musical notation system according to an embodiment of the present application.

As shown in FIG. 3, a score a is a normal score in the numbered musical notation, recorded by using a movable do solfège manner, looks concise and is easy to sing by following the score visually, but it does not clearly correspond to an original key (see below) and is hard to be followed by playing piano. A score b adopts the original key (1=$^b$A), is recorded by using a fixed do solfège manner, and there are many sharp notes in the score b though actual pitches are reflected so that it is hard to sing by following the score visually and is still hard to be followed by playing piano. A score c applies the musical notation system according to an embodiment of the present application and corresponds to the score b while the pitch symbols in the score c directly represent the white keys and black keys of the piano keyboard respectively with the sharp notes changed to the numbers corresponding to the black keys as shown in FIG. 2, which is easy to be followed by playing piano.

Therefore, with the musical notation system according to the present embodiment, a music beginner can easily locate keys on a keyboard of a keyboard instrument according to the score, thereby easily starting playing the keyboard instrument, which greatly lowers a threshold of playing the keyboard instrument. Especially for those knowing a little about the numbered musical notation system, it is quite easy to grasp the musical notation system according to the present embodiment.

For those knowing nothing about the numbered musical notation system, the present application further proposes following musical notation system.

FIG. 4 is a schematic view of a structure of a musical notation system according to another embodiment of the present application.

As shown in FIG. 4, the musical notation system according to another embodiment of the present application includes a pitch symbol and a duration symbol represented by using a grid. One grid represents a minimum fixed duration of a note which can be either a minimum duration of a score or a set possible minimum duration. For example, a score "Ode to joy" as shown in FIG. 4 has an eighth note or a quaver as a minimum duration unit (half beat), so each grid shown represents a half beat (eighth note) and each grid can represent "pressing a key" for a fixed duration (half beat).

Likewise, the musical notation system according to another embodiment of the present application also uses the pitch symbol to directly represent the piano keyboard (or a keyboard of a keyboard instrument), corresponding to a number representing a pitch in the numbered musical notation system. As shown in FIG. 4, a number can be used to represent a pitch, just like 1, 2, 3, 4, 5, 6, 7 used in the numbered musical notation system. However, the pitch symbols representing a white key and a black key of the piano keyboard in FIG. 4 are shown respectively in different forms: in FIG. 4, the number mapped to the white key is shown in a normal form (black character on white background), while the number mapped to the black key is shown in a reverse display form (white character on black background), and optional display forms further include a hollow number such as 4 in FIG. 4.

Likewise, as shown in FIG. 2, in each group of sub-keyboard in the musical notation system according to another embodiment of the present application, the 7 white keys can be represented by 1, 2, 3, 4, 5, 6, 7 (solfège: do, re, mi, fa, sol, la, si) and the 5 black keys can be represented by 1, 2, 3, 4, 5. The different groups of sub-keyboards can be represented by adding a dot over or under the number where a dot over the number is added to represent an octave higher in pitch and a dot under the number is added to represent an octave lower in pitch, and the number without any dot represents an absolute high of a note in the one-line octave 24 of the piano keyboard.

Furthermore, in the musical notation system according to another embodiment of the present application, the pitch symbol within a grid represents a note with the pitch having a minimum fixed duration, and one or more continuous blank grids just after the grid with the pitch symbol represent the pitch continuing the duration represented by the blank grids. For example, starting the score as shown in FIG. 4, a blank grid just after a grid embracing a starting pitch 3 and before a grid embracing another pitch 3, represents the note 3 (the key E in the one-line octave of the piano keyboard) with a duration represented by two grids (one beat), followed by another note 3. Thus, when playing a keyboard instrument, the key E in the one-line octave of the keyboard is pressed for one beat duration; and it is intuitive and very easy to play a keyboard instrument by following such score visually.

In one embodiment, the pitch symbol in the musical notation system according to another embodiment of the present application can also adopt a letter like C, D, E, F, G, A, or B expressing a pitch name.

In another embodiment, the pitch symbol in the musical notation system according to another embodiment of the present application can adopt a tag other than the dot (for example, ˆ) to represent the octave change in pitch.

Therefore, with the musical notation system according to the present embodiment, a music beginner knowing nothing about the numbered musical notation system can easily locate keys on a keyboard of a keyboard instrument according to the score, thereby easily starting playing the keyboard instrument, which greatly lowers a threshold of playing the keyboard instrument. For those beginners knowing nothing about the numbered musical notation system, it is quite easy to grasp the musical notation system according to the present embodiment, making it easier to start playing piano.

Figure 5:
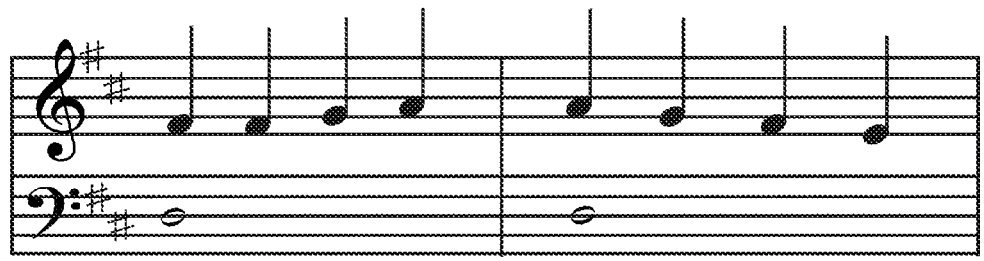
FIG. 5 is a schematic view of a structure of a musical notation system according to yet another embodiment of the present application.
Figure 5:
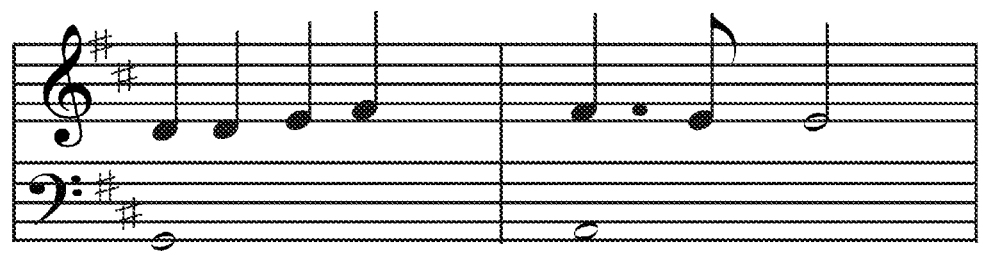
Figure 5:
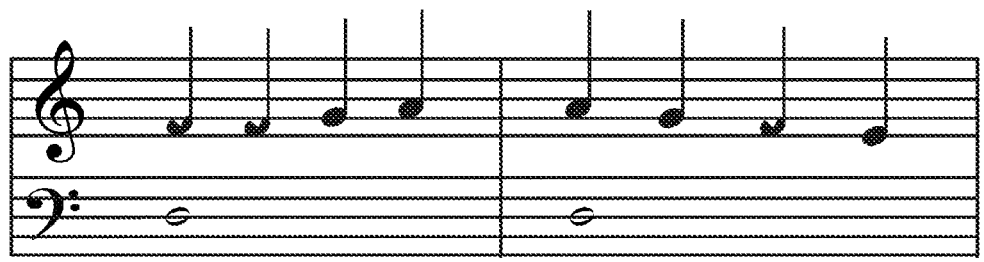
Figure 5:
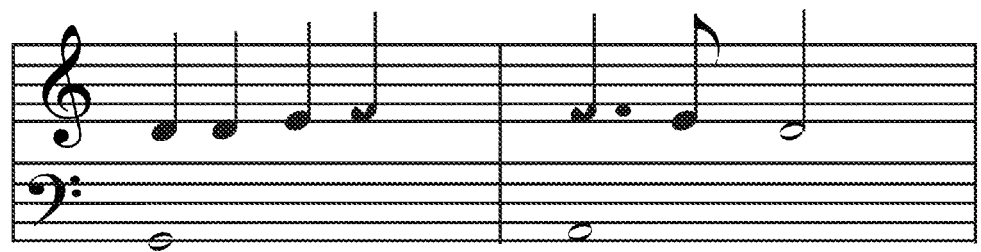

FIG. 5 is a schematic view of a structure of a musical notation system according to yet another embodiment of the present application.

As shown in FIG. 5, part b shows the structure of the musical notation system according to yet another embodiment of the present application, including a grand staff without any sharp or flat sign on lines and spaces; and a note-head with a tag, corresponding to a note-head on a line or space with a sharp or flat sign in a legacy stave, wherein the tag differs sharp from flat. Part a as shown in FIG. 5 shows a score in the legacy stave, corresponding to the score shown in part b.

It can be seen by comparing part a with part b that, the musical notation system according to yet another embodiment of the present application makes improvement on the legacy stave by removing the complex sharp and flat tags representing a key signature but tagging directly on noteheads of corresponding notes requiring sharp or flat instead, which simplifies the structure of sharp and flat tags in the musical notation system.

Specifically, for notes at lines and spaces with a sharp or flat sign, tags of sharp or flat are made on the note-heads thereof while the sharp or flat signs are removed from the lines and spaces. The tag on the note-head includes a notch on the note-head. For example, the notch pointing upward on the note-head represents a sharp, and the notch pointing downward on the note-head represents a flat. That is to say, the note-head with the notch pointing upward thereon represents a pitch sharp to the original note without any notch, and the note-head with the notch pointing downward thereon represents a pitch flat to the original note without any notch.

Figure 6:
FIG. 6 is a schematic view of notes in a musical notation system according to yet another embodiment of the present application.

FIG. 6 is a schematic view of notes in a musical notation system according to yet another embodiment of the present application.

As shown in FIG. 6, from top to bottom, six rows show respectively notes sharp (two forms listed) to and flat (two forms listed) to a whole note (semibreve), a half note (minim), a quarter note (crotchet), an eighth note (quaver), a sixteenth note (semi-quaver), and a thirty second note (demi-semi-quaver) in the grand staff.

With the musical notation system according to the present embodiment, no tag of sharp or flat sign is needed on lines and spaces in the grand staff; instead the sharp or flat is directly tagged on necessary notes. Such representation is clear and simple, which facilitates identifying an actual pitch of a note in a score with sharp or flat signs.

The embodiments of the present application have been described above. The above descriptions are exemplary but not exhaustive, and the present application is not limited to the embodiments disclosed. Various modifications and alterations are obvious to a person of ordinary skill in the art without departing from the spirit and scope of the described embodiments. Therefore, the protection scope of the present application shall be defined by the appended claims.

The invention claimed is:

1. A musical notation system, comprising:
   a pitch symbol representing a key of a keyboard instrument,
      wherein the pitch symbol corresponds to a number representing a pitch in a numbered musical notation system,
      wherein the pitch symbol is displayed in a first form when representing a white key of the keyboard instrument, and
      wherein the pitch symbol is displayed in a second form when representing a black key of the keyboard instrument; and
   a duration symbol representing a duration of the pitch symbol, the duration symbol corresponding to a symbol representing a duration in the numbered musical notation system.

2. The musical notation system of claim 1, wherein:
   the pitch symbol representing a white key comprises a number from 1, 2, 3, 4, 5, 6, 7, and the pitch symbol representing a black key comprises a number from 1, 2, 3, 4, 5.

3. The musical notation system of claim 2, wherein:
   the pitch symbol further comprises a tag over or under the number, respectively representing a noctave higher or lower in pitch in the numbered musical notation system.

4. The musical notation system of claim 3, wherein:
   the tag comprises at least one of a dot, a caret, or a pre-defined mark.

5. The musical notation system of claim 4, wherein:
   the pitch symbol comprises the number without any tag, representing an absolute high in pitch of a note in one-line octave of a keyboard instrument.

6. The musical notation system of claim 1, wherein:

the first form of the pitch symbol displayed when representing a white key of the keyboard instrument comprises a form of black character and white background, and the second form of the pitch symbol displayed when representing a black key of the keyboard instrument comprises at least one of a reverse display form of white character and black background, a number in a circle, or any other pre-defined form differing from the first form.

7. A musical notation system, comprising:

a grid representing a minimum fixed duration of a note; and a pitch symbol representing a key of a keyboard instrument, wherein the pitch symbol corresponds to a number representing a pitch in a numbered musical notation system, wherein the pitch symbol is displayed in a first form when representing a white key of the keyboard instrument, wherein the pitch symbol is displayed in a second form when representing a black key of the keyboard instrument, and wherein the pitch symbol within the grid represents a note with the pitch having the minimum fixed duration.

8. The musical notation system of claim 7, wherein:

the pitch symbol representing a white key comprises a number from 1, 2, 3, 4, 5, 6, 7, and the pitch symbol representing a black key comprises a number from 1, 2, 3, 4, 5.

9. The musical notation system of claim 8, wherein:

the pitch symbol further comprises a tag over or under the number, respectively representing a noctave higher or lower in pitch in the numbered musical notation system.

10. The musical notation system of claim 9, wherein:

the tag comprises at least one of a dot, a caret, or a pre-defined tag form.

11. The musical notation system of claim 10, wherein:

the pitch symbol comprises the number without any tag, representing an absolute high in pitch of a note in one-line octave of a keyboard instrument.

12. The musical notation system of claim 7, wherein:

the first form of the pitch symbol displayed when representing a white key of the keyboard instrument comprises a form of black character and white background, and the second form of the pitch symbol displayed when representing a black key of the keyboard instrument comprises at least one of a reverse display form of white character and black background, a number in a circle, or any other pre-defined form differing from the first form.

13. The musical notation system of claim 7, wherein:

one or more continuous blank grids just after the grid with the pitch symbol represent the pitch continuing the duration represented by the blank grids.

14. A musical notation system, comprising:

a grand staff without any sharp or flat sign on lines and spaces; and a note-head with a tag, corresponding to a note-head on a line or space with a sharp or flat sign in a legacy stave, wherein the tag comprises a notch on the note-head and differs sharp from flat.

15. The musical notation system of claim 14, wherein the notch pointing upward on the note-head represents a sharp, and the notch pointing downward on the note-head represents a flat.

* * * * *